(12) United States Patent
Souloglou et al.

(10) Patent No.: US 7,421,686 B2
(45) Date of Patent: *Sep. 2, 2008

(54) PROGRAM CODE CONVERSION

(75) Inventors: Jason Souloglou, Manchester (GB); Alasdair Rawsthorne, Manchester (GB)

(73) Assignee: Transitive Limited, Manchester (GB)

( * ) Notice: Subject to any disclaimer, the term of this patent is extended or adjusted under 35 U.S.C. 154(b) by 518 days.

This patent is subject to a terminal disclaimer.

(21) Appl. No.: 10/165,029

(22) Filed: Jun. 6, 2002

(65) Prior Publication Data

US 2003/0033596 A1    Feb. 13, 2003

Related U.S. Application Data

(60) Division of application No. 09/828,049, filed on Apr. 6, 2001, which is a continuation-in-part of application No. PCT/GB99/03168, filed on Oct. 11, 1999.

(60) Provisional application No. 60/115,952, filed on Jan. 14, 1999, now abandoned.

(30) Foreign Application Priority Data

Oct. 10, 1998    (GB) ................................. 9822075.9

(51) Int. Cl.
*G06F 9/45* (2006.01)
*G06F 9/44* (2006.01)
(52) U.S. Cl. ..................... 717/146; 717/136; 717/158
(58) Field of Classification Search ......... 717/136–160; 719/313; 714/53
See application file for complete search history.

(56) References Cited

U.S. PATENT DOCUMENTS 4,667,290 A * 5/1987 Goss et al. ................. 717/147

5,119,465 A * 6/1992 Jack et al. .................. 717/137
5,274,820 A * 12/1993 Gillet ........................ 717/139

(Continued)

FOREIGN PATENT DOCUMENTS

EP        0 285 310 A2    10/1988

(Continued)

OTHER PUBLICATIONS

Aho et al., Compilers, principles, techniques, Mar. 1986.*

(Continued)

*Primary Examiner*—Wei Zhen
*Assistant Examiner*—Satish S. Rampuria
(74) *Attorney, Agent, or Firm*—Wilmer Cutler Pickering Hale and Dorr LLP

(57) ABSTRACT

A method of dynamic real time translation of first program code written for a first programmable machine into second program code (target code) for running on a second programmable machine, the method employing run time generation of an intermediate representation of the first program code. Upon first encountering a given portion of program code, only the target code necessary to execute that portion of program code under a prevailing set of entry conditions is initially generated and stored. When the same portion of program code is again encountered, a determination is made as to whether intermediate representation corresponding to a second subsequent set of conditions has been generated. If not, the target code necessary to execute the same portion of program code under that second set of conditions is generated.

13 Claims, 5 Drawing Sheets

U.S. PATENT DOCUMENTS

| | | | |
|---|---|---|---|
| 5,471,633 A | | 11/1995 | Colwell et al. |
| 5,491,821 A | | 2/1996 | Kilis |
| 5,586,323 A | | 12/1996 | Koizumi et al. |
| 5,613,117 A | * | 3/1997 | Davidson et al. ............ 717/144 |
| 5,642,523 A | * | 6/1997 | Sakaue ........................ 712/41 |
| 5,659,753 A | * | 8/1997 | Murphy et al. .............. 717/147 |
| 5,764,368 A | * | 6/1998 | Shibaki et al. .............. 358/296 |
| 5,768,593 A | * | 6/1998 | Walters et al. .............. 717/141 |
| 5,784,588 A | | 7/1998 | Leung |
| 5,805,895 A | * | 9/1998 | Breternitz et al. ........... 717/160 |
| 5,832,205 A | * | 11/1998 | Kelly et al. .................... 714/53 |
| 5,872,950 A | | 2/1999 | Levitan et al. |
| 5,912,904 A | * | 6/1999 | Monier ........................ 714/781 |
| 5,930,509 A | | 7/1999 | Yates et al. |
| 6,075,942 A | * | 6/2000 | Cartwright, Jr. ............. 717/138 |
| 6,163,790 A | * | 12/2000 | Monier ........................ 708/491 |
| 6,199,152 B1 | | 3/2001 | Kelly et al. |
| 6,424,987 B1 | * | 7/2002 | Romain ....................... 708/492 |
| 6,463,582 B1 | | 10/2002 | Lethin et al. |
| 6,820,266 B1 | * | 11/2004 | Minakawa et al. .......... 719/313 |
| 2001/0042189 A1 | * | 11/2001 | Babaian et al. ................ 712/23 |
| 2003/0191622 A1 | * | 10/2003 | Rawsthorne et al. .......... 703/23 |
| 2004/0221278 A1 | * | 11/2004 | Dankel et al. ................ 717/139 |
| 2004/0221279 A1 | * | 11/2004 | Lovett et al. ................. 717/151 |
| 2004/0221280 A1 | * | 11/2004 | Bolton et al. ................ 717/151 |

FOREIGN PATENT DOCUMENTS

| | | |
|---|---|---|
| EP | 0 798 636 A1 | 10/1997 |
| EP | 0822485 | 2/1998 |
| WO | WO 98/59292 | 12/1998 |

OTHER PUBLICATIONS

Franz, Run-time code generation as a central system service, IEEE, May 5-6, 1997 pp. 112-117.*

Kuroda et al., A knowledge-based compiler enhancing DSP internal parallelism, IEEE, Jun. 11-14, 1991 pp. 236-239 vol. 1.*

A program anti-compiler, Letovsky, S., Jan. 1989, IEEE, pp. 504-512 vol. 2.*

Automatic extraction of functional parallelism from ordinary programs, Girkar, M.; Polychronopoulos, C.D., vol. 3 Issue: 2, Mar. 1992, IEEE, pp. 166-178.*

An efficient technique to remove transformations [program codes], Chyi-Ren Dow; Soffa, M.L.; Shi-Kuo Chang, Dec. 1994, IEEE, pp. 392-397.*

Assembly to high-level language translation, Cifuentes, C.; Simon, D.; Fraboulet, A., Nov. 1998, IEEE, pp. 228-237.*

"Register Assignment Technique in Computer Emulation," *IBM Technical Disclosure Bulletin*, 37(2A):157 (1994).

Adl-Tabatabai, et al., "Fast, Effective Code Generation in a Just-In-Time Java Compiler," *ACM Sigplan Notices*, 33(5):280-290 (1998).

Afzal, et al., "Motorola PowerPC Migration Tools—Emulation and Translation," *Digest of Papers of the Computer Society*, 41:145-150 (1996).

Aho, et al., "Chapter 9: Code Generation," *Compilers- Principles, Techniques, and Tools*, 522-584 (1986).

Aho, et al., "Chapter 10: Code Optimization," *Compilers- Principles, Techniques, and Tools*, 603-722 (1986).

Andrews, et al., "Migrating a CISC Computer Family onto RISC via Object Code Translation," *ACM Sigplan Notices*, 27(9):213-222 (1992).

Halfhill, "Emulation: RISC's Secret Weapon," *Byte*, 19(4):119-120, 122, 124, 126, 128, 130 (1994).

Timmins, "Techniques for Translating Object Code into a Reduced Microprocessor Architecture," *Proceedings of the ISMM International Conference*, 181-184 (1986).

Witchel, et al., "Embra: Fast and Flexible Machine Simulation," *Sigmetrics*, 68-79 (1996).

Aho et al., Compiler, Principles, Techniques, and Tools, pp. 12, 14, 290-291, 347, 463, 1986.

Goodwin D.W. et al. "Optimal and Near Optimal Global Register Allocation Using 0-1 Integer Programming." *Software Practice and Experience*. Wiley & Sons, Bognor Regis, gB. vol. 26, No. 8. Aug. 1996. pp. 929-965. XP000673808.

European Search Report for European Patent Application No. 03 02 0510 mailed Jul. 19, 1007.

* cited by examiner

|  | 31 | 15 | 7 | 0 |  |
|---|---|---|---|---|---|
| move.1 (a0),d0 | | | | | d0 |
| add.b #x,d0 | | | | | d0 |
| move.1 d0,(a0) | | | | | (a0) |

FIG. 8

PROGRAM CODE CONVERSION

CROSS REFERENCE TO RELATED APPLICATIONS

This application is a divisional of and claims benefit to U.S. patent application Ser. No. 09/828,049, filed Apr. 6, 2001, which is designated a CIP of PCT/GB99/03168, filed Oct. 11, 1999, which is incorporated by reference in its entirety herein, and claims priority to U.S. Provisional Patent Application No. 60/115,952, filed on Jan. 14, 1999, now abandoned, which is incorporated by reference in its entirety herein, and claims priority to GB Patent Application No. 9822075.9, filed Oct. 10, 1998, now abandoned, which is incorporated by reference in its entirety herein.

BACKGROUND OF THE INVENTION

1. Field of the Invention

The present invention relates to a method and system for converting program code from one format to another. In particular, the invention relates to a method and system for providing an intermediate representation of a computer program or a Basic Block of a program (a Basic Block of a program is a block of instructions that has only one entry point, at a first instruction, and only one exit point, at a last instruction of the block). For instance, the present invention provides a method and system for the translation of a computer program which was written for one processor so that the program may run efficiently on a different processor; the translation utilising an intermediate representation and being conducted in a block by block mode.

2. Description of Related Art

Intermediate representation is a term widely used in the computer industry to refer to forms of abstract computer language in which a program may be expressed, but which is not specific to, and is not intended to be directly executed on, any particular processor. Intermediate representation is for instance generally created to allow optimisation of a program. A compiler for example will translate a high level language computer program into intermediate representation, optimise the program by applying various optimisation techniques to the intermediate representation, then translate the optimised intermediate representation into executable binary code. Intermediate representation is also used to allow programs to be sent across the Internet in a form which is not specific to any processor. Sun Microsystems have for example developed a form of intermediate representation for this purpose which is known as bytecode. Bytecode may be interpreted on any processor on which the well known Java (trade mark) run time system is employed.

Intermediate representation is also commonly used by emulation systems which employ binary translation. Emulation systems of this type take software code which has been compiled for a given processor type, convert it into an intermediate representation, optimise the intermediate representation, then convert the intermediate representation into a code which is able to run on another processor type. Optimisation of generating an intermediate representation is a known procedure used to minimise the amount of code required to execute an emulated program. A variety of known methods exist for the optimisation of an intermediate representation.

An example of a known emulation system which uses an intermediate representation for performing binary translation is the FlashPort system operated by AT&T. A customer provides AT&T with a program which is to be translated (the program having been compiled to run on a processor of a first type). The program is translated by AT&T into an intermediate representation, and the intermediate representation is optimised via the application of automatic optimisation routines, with the assistance of technicians who provide input when the optimisation routines fail. The optimised intermediate translation is then translated by AT&T into code which is able to run on a processor of the desired type. This type of binary translation in which an entire program is translated before it is executed is referred to as 'static' binary translation. Translation times can be anything up to several months.

In an alternative form of emulation, a program in code of a subject processor (i.e. a first type of processor for which the code is written and which is to be emulated) is translated in Basic Blocks, via an intermediate representation, into code of a target processor (i.e. a second type of processor on which the emulation is performed).

SUMMARY

The following is a summary of various aspects and advantages realizable according to various embodiments of the invention. It is provided as an introduction to assist those skilled in the art to more rapidly assimilate the detailed discussion of illustrative embodiments which ensues and does not and is not intended in any way to limit the scope of the claims which are appended hereto in order to particularly point out the invention.

A first aspect of the present invention provides a method of generating an intermediate representation of program code, the method comprising the computer implemented steps of:

generating a plurality of register objects representing abstract registers, a single register object representing a respective abstract register; and generating expression objects each representing a different element of the subject code as that element arises in the program, each expression object being referenced by a register object to which it relates either directly, or indirectly via references from other expression objects.

An element of subject code is an operation or sub-operation of a subject code instruction. Each subject code instruction may comprise a number of such elements so that a number of expression objects may be generated to represent a single subject code instruction.

Also according to another aspect of the invention there is provided a method for generating an intermediate representation of computer program code written for running on a programmable machine, said method comprising:

(i) generating a plurality of register objects for holding variable values to be generated by the program code; and (ii) generating a plurality of expression objects representing fixed values and/or relationships between said fixed values and said variable values according to said program code;

said objects being organised into a branched tree-like network having all register objects at the lowest basic root or tree-trunk level of the network with no register object feeding into any other register object.

When forming an intermediate representation it is necessary to include a representation of the status of a subject processor (for instance of its registers or memory space) which is being represented by the intermediate representation. In the present invention this is done in a particularly efficient manner by creating abstract registers.

According to another aspect of the present invention only a single register object need be generated to represent a given abstract register (which is preferable done for all abstract registers at initilisation), the state of each abstract register being defined by the expression objects referenced by the corresponding register object. Where more than one expression object is referenced by a given register object a "tree" of expression objects is generated having the register object as its 'root'. The expression trees referenced by each of the register objects will together form an "expression forest".

An advantage realizable according to the teachings herein is that any given expression object may be referenced to more than one register, and consequently an expression which is used by several different registers is not required to be created and assigned to each of those registers separately, but may be created once and referenced to each of the registers. In other words, expression trees may be linked together by expression objects which are referenced by more than one register object. Thus, a given expression object may be common to a number of expression trees within the expression forest.

By avoiding making multiple copies of the same expression, the invention reduces the time required to create the intermediate representation, and reduces the memory space occupied by the intermediate representation.

A further advantage realizable according to the teachings herein is that expressions that become redundant can be very efficiently identified. When a new expression is assigned to a register object any expression previously referenced by that register object becomes redundant, except insofar as it is referenced by other register objects. These multiple references are detected using reference counting, described below.

Any given expression object may have references from it to other expression objects, and references to it from other expression objects or from abstract registers. A count is preferably maintained of the number of references leading to each expression object. Each time a reference to an expression object (either from a register or another expression object) is made or removed, the count for that expression object is adjusted. A count of zero for a given expression object indicates that there are no references leading to that expression object, and that that expression object is therefore redundant.

Preferably, when a count for a given expression object is zero, that expression object is eliminated from the intermediate representation.

When an expression object is eliminated, the deletion of all references which lead from that expression object results in each referenced expression object having its reference count decremented. Where this decremented value has reached zero, the referenced object can be eliminated in turn, causing its referenced objects to have their reference counts decremented in turn.

The intermediate representation of the invention thus allows redundant code to be located and eliminated efficiently. In binary translated programs, redundant code frequently arises when the contents of a register are defined and subsequently redefined without first being used. The known existing intermediate representations require that a record be kept indicating when the contents of a given register are defined, and indicating when the contents of that register are used. This record keeping is an inefficient method of identifying redundant code. In the present invention, redundant code is immediately apparent from the sequence of assignments to and uses of the register objects.

According to another aspect of the present invention there is provided a method for generating an intermediate representation of computer code written for running on a programmable machine, said method comprising:
  (i) generating a plurality of register objects for holding variable values to be generated by the program code; and
  (ii) generating a plurality of expression objects representing fixed values and/or relationships between said fixed values and said variable values according to said program code;
wherein at least one variably sized register is represented by plural register objects, one register object being provided for each possible size of the variably sized register.

According to another aspect of the present invention there is provided a method of generating an intermediate representation of program code expressed in terms of the instruction set of a subject processor comprising at least one variable sized register, the method comprising the computer implemented steps of:
  generating a set of associated abstract register objects representing a respective one of the or each variable sized processor registers, the set comprising one abstract register for each possible width of the respective variable size register;
  for each write operation of a certain field width to the variable sized register, writing to an abstract register of the same width;
  maintaining a record of which abstract registers contain valid data, which record is updated upon each write operation; and
  for each read operation of a given field width, determining from said record whether there is valid data in more than one of said different sized abstract registers of the set which must be combined to give the same effect as the same read operation performed upon the variable size register; and
    a) if it is determined that no combination is so required, reading directly from the appropriate register, or
    b) if it is determined that data from more than one register must be so combined, combining the contents of those registers.

In the above, variable-sized register is intended to mean a register whose contents may be modified by writing values to sub-fields which overlay part or parts of the full width of the register.

Whether or not data from more than one register must be combined, and if so which registers must be combined, may be determined in accordance with the following conditions in respect of each set of different sized abstract registers:
  i) if the data required for an access lies wholly within one valid abstract register, that register only is accessed; and
  ii) if the data required for an access lies within more than one valid abstract register, data is combined from those valid abstract registers to perform the access.

For instance, in known subject processors including the Motorola 68000 series it would be necessary to access only a single register in accordance with step (i) above when:
  a) there is valid data in only one of said abstract registers, in which case that register is accessed;
  b) if there is valid data in a register of a size corresponding to the width of the access and no valid data in any smaller register, then only the register corresponding in size to the width of the access is accessed; and
  c) if the registers containing valid data are larger than the register corresponding in size to the width of the access, only the smallest of the registers containing valid data is accessed.

Also, in known subject processors if data required for an access lies within more than one valid abstract register such that data from two or more registers must be combined, the combination may be performed as follows:
  a) if there is valid data in two or more registers of a size corresponding to or smaller than the width of the read operation, data from each of those registers is combined; and
  b) if there is no data in a register corresponding in size to the size of the read operation, but there is data in a larger register and a smaller register, data from each of those registers is combined.

When the intermediate representation is representing a region of a program (comprising one or more Basic Blocks) in which all register accesses are of the same width, there is no requirement to combine the contents of the abstract registers, and data may simply be written to or read from a single abstract register in a single operation. The target processor code will therefore be simplified. The more complicated procedure of combining the contents of two abstract registers will only be required where any particular region of code includes register accesses of different bit widths.

The foregoing approach enables overcoming a problem which arises during emulation of a processor, and specifically when the emulated processor utilises variable sized registers. The nature of the problem addressed is best appreciated by example.

An example of an instruction-set which uses a variable-sized resister is the Motorola 68000 architecture. In the 68000architecture, instructions that are specified as 'long' (0.1).
operate on all 32 bits of a register or memory location. Instructions that are specified as 'word' (.w). or 'byte' (.b). operate on only the bottom 16 and bottom 8 bits respectively, of a register or memory location. Even if a byte addition, for example, generates a carry, that carry is not propagated into the 9th bit of the register.

A situation which occurs in variable-sized registers is illustrated in an 68000 code example shown in FIG. 8.

|  | 31 | 15 | 7 | 0 |  |
|---|---|---|---|---|---|
| move.l (a0),d0 |  |  |  |  | d0 |
| add.b #x,d0 |  |  |  |  | d0 |
| move.l d0,(a0) |  |  |  |  | (a0) |

The initial 'move.l' instruction in the example writes to all 32 bits of the register address 'd0'. This is illustrated above by the lighter shading covering all parts of the box representing register 'd0'. The 'add.b' instruction writes only to the bottom 8 bits of register 'd0', and the top 24 bits remain in exactly the same state they were in before the 'add.b' instruction. The part of register 'd0' that has been affected by the 'add.b' instruction is shown by darker shading. If the entire content of the register 'd0' is now copied to another register or to memory, the bottom 8 bits copied will be those generated by the 'add.b' instruction, and the top 24 bits copied will be those generated by the 'move.l' instruction.

An emulation system must represent each of the registers used by a subject processor which it is emulating. When an intermediate representation of a program is produced as part of an emulation, it is preferable that intermediate representation is capable of being converted into code which will execute on any architecture of target processor. Thus, the intermediate representation should preferably not include any assumptions regarding the type of target processor which will be used to execute the code. In this case, the particular assumption which must be avoided is the assumption that the upper 24 bits of a 32 bit register on a target processor will be maintained in their existing form when the 8 bits of data are written to the register as described in the example above. Some possible target processors will instead write the 8 bits of data to the lowest 8 bits of a register, and then fill the remaining 24 bits with zeros. The intermediate representation should preferably be constructed in such a way that it may be executed on a target processor of either form (once it has been translated into the appropriate code).

One manner in which this problem may be overcome is to create a complex expression which manipulates different sections of a target processor register in an appropriate manner—the expression required in this example would be as follows:

$$d0=((d0+x)\ \&\ 0xff)|(d0\ \&\ 0xffffff00)$$

This expression performs a 32-bit addition on the target processor register, extracts the bottom 8 bits, and then restores the top 24 bits to their original value.

It is unusual to find an instruction which manipulates data of a certain width between two instructions which manipulate data of different widths, (the situation that was illustrated above). It is more usual to find groups of instructions which manipulate data of the same width grouped together in programs. One region of a program, for example, may operate on bytes of data, for example character processing code, and another region of the program may operate on 32-bit wide data for example pointer manipulation code. In these common cases where each self-contained region of code operates on data of only a single width, no special action needs to be taken. For example, if a region of a program is moving and manipulating only bytes, these byte values may be stored in 32-bit registers of a target processor, and the top 24 bits of the registers ignored since these 24 bits are never accessed. If the program then starts manipulating 16-bit wide data, those target processor registers which are involved in the 16-bit operations are very likely to be loaded with 16-bit items before any word operations take place, and as a result, no conflicts will occur (ie. the top 16 bits of data are ignored). However, there is no way of knowing whether it is necessary to preserve the top 24 bits of the registers (for example) during the earlier operations which use byte values, until operations using 16 or 32 bits are encountered.

Since there is no way of knowing whether all or some of the bits held in a register may be discarded, the above described technique of building complex expressions to represent operations which use conflicting operand widths must be applied to every instruction in order to function correctly. This technique which is used in the known intermediate representations therefore imposes a major overhead in order to solve a problem which occurs only occasionally.

The use of separate abstract registers to represent each of the possible sizes of subject processor registers as described above, is advantageous because it allows data to be written to or moved from an abstract register in the intermediate representation without requiring extra processing during a region of a program which uses only one width of data. Thus a calculation only need be made (ie. the combination of data of different widths) on those infrequent occasions when the intermediate representation is required to represent data of different widths being written to and read from a subject processor register.

Yet another aspect of the present invention reduces the amount of translated code. It is a property of subject code that:
  i) a Basic Block of code may have alternative and unused entry conditions. This may be detected at the time the translation is performed; and
  ii) a Basic Block of code may have alternative, and unused, possible effects or functions. In general, this will only be detectable when the translated code is executed.

According to another aspect of the present invention, there is provided a method of generating an intermediate representation of computer program code, the method comprising the computer implemented steps of:
  on the initial translation of a given portion of subject code, generating and storing only intermediate representation which is required to execute that portion of program code with a prevailing set of conditions; and
  whenever subsequently the same portion of subject code is entered, determining whether intermediate representation has previously been generated and stored for that portion of subject code for the subsequent conditions, and if no such intermediate representation has previously been generated, generating additional intermediate representation required to execute said portion of subject code with said subsequent conditions.

Such approaches reduce the amount of translated code by permitting multiple, but simpler, blocks of intermediate representation code for single Basic Blocks of subject code. In most cases only one simpler translated block will be required.

According to another aspect of the present invention, there is provided a method for generating an intermediate representation of computer code written for running on a programmable machine, said method comprising:
  (i) generating a plurality of register objects for holding variable values to be generated by the program code; and
  (ii) generating a plurality of expression objects representing fixed values and/or relationships between said fixed values and said variable values according to said program code;
  said intermediate representation being generated and stored for a block of computer code and subsequently re-used if the same block of code is later re-entered, and wherein at least one block of said first computer program code can have alternative un-used entry conditions or effects or functions and said intermediate representation is only initially generated and stored as required to execute that block of the program code with a then prevailing set of conditions.

For instance, in a preferred embodiment of the invention the method includes computer implemented steps of:
  generating an Intermediate Representation Block (IR Block) of intermediate representation for each Basic Block of the program code as it is required by the program, each IR Block representing a respective Basic Block of program code for a particular entry condition;

storing target code corresponding to each IR Block; and when the program requires execution of a Basic Block for a given entry condition, either:

a) if there is a stored target code representing that Basic Block for that given entry condition, using said stored target code; or b) if there is no stored target code representing that Basic Block for that given entry condition, generating a further IR Block representative of that Basic Block for that given entry condition.

A Basic Block is a group of sequential instructions in the subject processor i.e. subject code. A Basic Block has only one entry point and terminates either immediately prior to another Basic Block or at a jump, call or branch instruction (whether conditional or unconditional). An IR Block is a block of intermediate representation and represents the translation of a Basic Block of subject code. Where a set of IR Blocks have been generated to represent the same Basic Block but for different entry conditions, the IR Blocks within that set are referred to below as IsoBlocks.

This approach may be applied to static translation, but is particularly applicable to emulation via dynamic binary translation. According to the invention, an emulation system may be configured to translate a subject processor program Basic Block by Basic Block. When this approach is used, the state of an emulated processor following execution of a Basic Block of program determines the form of the IR Block used to represent a succeeding Basic Block of the program.

In contrast, in known emulators which utilise translation, an intermediate representation of a Basic Block of a program is generated, which is independent of the entry conditions at the beginning of that Basic Block of program. The intermediate representation is thus required to take a general form, and will include for example a test to determine the validity (or otherwise) of abstract registers. In contrast to this, in the present invention the validity (or otherwise) of the abstract registers is already known and the IR block therefore does not need to include the validity test. Furthermore, since the validity of the abstract registers is known, the IR block will include only that code which is required to combine valid abstract registers and is not required to include code capable of combining all abstract registers. This provides a significant performance advantage, since the amount of code required to be translated into intermediate representation for execution is reduced. If a Basic Block of a program has previously been translated into intermediate representation for a given set of entry conditions, and if it commences with different entry conditions, the same Basic Block of the program will be re-translated into an IsoBlock of intermediate representation.

A further advantage is that the resulting IR Blocks and IsoBlocks of intermediate representation are less complex than an intermediate representation which is capable of representing all entry conditions, and may therefore be optimised more quickly and will also be translated into target processor code which executes more quickly.

This approach also exploits subject code instructions which may have a number of possible effects or functions, not all of which may be required when the instruction is first executed, and some of which may not in fact be required at all. This aspect of the invention may only be used when the intermediate representation is generated dynamically. That is, a preferred method according to the present invention preferably comprises, when the intermediate representation of the program is generated dynamically as the program is running, the computer implemented steps of:

at a first iteration of a particular subject code instruction having a plurality of possible effects or functions, generating and storing special-case intermediate representation representing only the specific functionality required at that iteration; and at each subsequent iteration of the same subject code instruction, determining whether special-case intermediate representation has been generated for the functionality required at said subsequent iteration and generating additional special-case intermediate representation specific to that functionality if no such special-case intermediate, representation has previously been generated.

This aspect of the invention overcomes a problem associated with emulation systems, namely the translation of unnecessary features of subject processor code. When a complex instruction is decoded from a subject processor code into the intermediate representation, it is common that only a subset of the possible effects of that instruction will ever be used at a given place in the subject processor program. For example, in a CISC (Complex Instruction Set Computer) instruction set, a memory load instruction may be defined to operate differently depending on what type of descriptor is contained in a base register (the descriptor describes how information is stored in the memory). However, in most programs only one descriptor type will be used by each individual load instruction of that program. A translator in accordance with this invention will generate special-case intermediate representation which includes a load instruction defined for only that descriptor type.

Preferably, when the special-case intermediate representation is generated and stored an associated test procedure is generated and stored to determine on subsequent iterations of the respective subject code instruction whether the required functionality is the same as that represented by the associated stored special-case intermediate representation, and where additional special-case intermediate representation is required an additional test procedure associated with that special-case intermediate representation is generated and stored with that additional special-case intermediate representation.

Preferably, the additional special case intermediate representation for a particular subject code instruction and the additional associated test procedure is stored at least initially in subordinate relation to any existing special-case intermediate representation and associated test procedures stored to represent the same subject instruction, such that upon the second and subsequent iteration of a subject code instruction determination of whether or not required special-case intermediate representation has previously been generated is made by performing said test procedures in the order in which they were generated and stored until either it is determined that special-case intermediate representation of the required functionality exists or it is determined that no such required special-case intermediate representation exists in which case more additional intermediate representation and another associated test procedure is generated.

Preferably the intermediate representation is optimised by adjusting the ordering of the test procedures such that test procedures associated with more frequently used special-case intermediate representation are run before test procedures associated with less frequently used special-case intermediate representation rather than ordering the test procedures in the order in which they are generated.

Intermediate representation generated in accordance with any of the above methods may be used, for instance, in the translation of a computer program written for execution by a processor of a first type so that the program may be executed by a different processor, and also as a step in optimising a computer program. In the latter case, intermediate representation may be generated to represent a computer program written for execution by a particular processor, that intermediate representation may then be optimised and then converted back into the code executable by that same processor.

Although the approach just described above relates to the generation of intermediate representation, the steps described therein may be applied to the generation of target code directly from subject code, without the generation of intermediate representation.

Thus, the present invention may also provide a method of generating target code representation of computer program code, the method comprising the computer implemented steps of:
- on the initial translation of a given portion of subject code, generating and storing only target code which is required to execute that portion of program code with a prevailing set of conditions; and
- whenever subsequently the same portion of subject code is entered, determining whether target code has previously been generated and stored for that portion of subject code for the subsequent conditions, and if no such target code has previously been generated, generating additional target code required to execute said portion of subject code with said subsequent conditions.

It will be appreciated that many of the features and advantages described in relation to the generation of intermediate representation will correspondingly apply to the generation of target code.

According to another aspect of the present invention there is provided a method of dynamically translating first computer program code written for compilation and/or translation and running on a first programmable machine into second computer program code for running on a different second programmable machine. Said method comprising:
(a) generating an intermediate representation of a block of said first computer program code;
(b) generating a block of said second computer program code from said intermediate representation;
(c) running said block of second computer program code on said second programmable machine; and
(d) repeating steps a-c in real time for at least the blocks of first computer program code needed for a current emulated execution of the first computer program code on said second programmable machine.

This method realises the benefits of using intermediate representation in the real time translation of computer code.

BRIEF DESCRIPTION OF THE DRAWINGS

An illustrative specific embodiment of the present invention applied to a dynamic emulation system will now be described, by way of example only, with reference to the accompanying drawings, in which:

FIG. 8 shows a 68000 code example of a situation that occurs in variable-sized registers.

DETAILED DESCRIPTION OF ILLUSTRATIVE EMBODIMENTS

Figure 1:
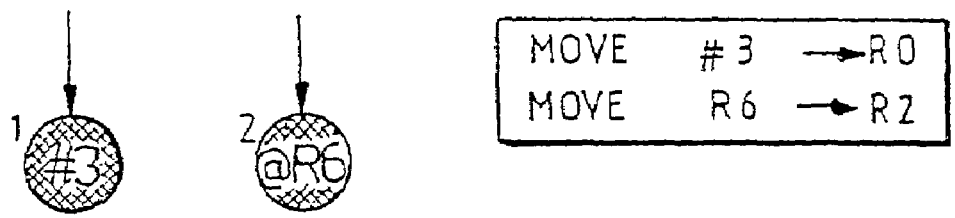
FIGS. 1 to 5 are schematic illustrations of the manner in which a dynamic emulation system according to the present invention generates an intermediate representation of a program or a Basic Block of a program, they also show the expression forest (group of expression trees) which is a novel feature of this invention.

The illustrative embodiments of the invention described below provide, among other aspects, a system for emulating the instruction set of one processor on a processor of a different type. In the following description the term subject processor refers to a processor which is to be emulated by an emulation system and target processor refers to a processor upon which the emulation system is run. The system is a dynamic binary translation system which essentially operates by translating Basic Blocks of instructions in the subject processor code into target processor code as they are required for execution. The emulation system, as described below, comprises three major components, referred to respectively as a Front End, a Core, and a Back End. The subject processor instructions are decoded and converted into the intermediate representation by the Front End of the emulation system. The Core of the emulation system analyses and optimises the intermediate representation of the subject processor instructions, and the Back End converts the intermediate representation into target processor code which will run on the target processor.

The Front End of the system is specific to the subject processor that is being emulated. The Front End configures the emulation system in response to the form of subject processor, for example specifying the number and names of subject processor registers which are required by the emulation, and specifying to the Back End the virtual memory mappings that will be required.

Subject processor instructions are converted into intermediate representation in Basic Blocks, each resulting intermediate representation block (IR Block) then being treated as a unit by the Core for emulation, caching, and optimisation purposes.

The Core optimises the intermediate representation generated by the Front End. The Core has a standard form irrespective of the subject and target processors connected to the emulation system. Some Core resources however, particularly register numbers and naming, and the detailed nature of IR Blocks, are configured by an individual Front End to suit the requirements of that specific subject processor architecture.

The Back End is specific to the target processor and is invoked by the Core to translate intermediate representation into target processor instructions. The Back End is responsible for allocating and managing target processor registers, for generating appropriate memory load and store instructions to emulate the subject processor correctly, for implementing a calling sequence to permit the Core to call dynamic routines, and to enable those dynamic routines to call Back End and Front End routines as appropriate.

The operation of the emulation system will now be described in more detail. The system is initialised, to create appropriate linkages between Front End, Core, and Back End. At the end of initialisation, an execution cycle is commenced, and the Core calls the front End to decode a first Basic Block of subject processor instructions. The Front End operates instruction by instruction, decoding each subject processor instruction of the Basic Block in turn, and calling Core routines to create an intermediate representation for each sub-operation of each instruction. When the Front End decodes an instruction that could possibly cause a change of program sequence (for instance a jump, call, or branch instruction, whether conditional or unconditional), it returns to the Core before decoding further subject processor instructions (thereby ending that Basic Block of code).

When the Front End has translated a Basic Block of subject processor instructions into the intermediate representation, the Core optimises the intermediate representation then invokes the Back End to dynamically generate a sequence of instructions in the target processor code (target instructions) which implement the intermediate representation of the Basic Block. When that sequence of target instructions is generated it is executed immediately. The sequence of target processor instructions is retained in a cache for subsequent reuse (unless it is first overwritten).

When the target processor instructions have been executed a value is returned which indicates an address which is to be executed next. In other words, the target processor code evaluates any branch, call, or jump instructions, whether conditional or unconditional, at the end of the Basic Block, and returns its effect. This process of translation and execution of Basic Blocks continues until a Basic Block is encountered which has already been translated.

When target code representing the next Basic Block has been used previously and has been stored in the cache, the Core simply calls that target code. When the end of the Basic Block is reached, again the target code supplies the address of the next subject instruction to be executed, and the cycle continues.

Both the intermediate representation and target-processor code are linked to Basic Blocks of subject processor instructions. The intermediate representation is linked so that the optimiser can generate efficient emulations of groups of frequently-executed IR Blocks, and the target code is linked so that the second and subsequent executions of the same Basic Block can execute the target code directly without incurring the overhead of decoding the instructions again.

The Front End requests that a required number of abstract registers be defined in the Core at initialisation time. These abstract registers (labelled Ri) represent the physical registers that would be used by the subject processor instructions if they were to run on a subject processor. The abstract registers define the state of the subject processor which is being emulated, by representing the expected effect of the instructions on the subject processor registers.

The intermediate representation represents the subject processor program by assigning expression objects to abstract registers. Expression objects are a means of representing in the intermediate representation the effect of, for example, an individual arithmetic, logical, or conditional operation. Since many subject processor instructions carry out manipulation of data, most instructions generate expression objects to represent their individual sub-operations. Expression objects are used, for example, to represent addition operations, condition setting operations, conditional evaluation in conditional branches, and memory read operations. The abstract registers are referenced to expression objects, which are referenced to other expression objects so that each Basic Block of subject processor instructions is represented by a number of inter-referenced expression objects which may be considered as an expression forest.

A series of illustrated examples will be used to convey how the emulation system uses expression objects (referred to as Expressions) and abstract registers to build up an intermediate representation of subject processor instructions. FIGS. 1 to 5 show step by step (with the progression of incremental steps indicated by reference numerals 1-12 in FIGS. 1 to 5), how the following pseudo-assembler code is represented in the Core using abstract registers:

| 1: | MOVE | #3 | → R0 |
| 2: | MOVE | R6 | → R2 |
| 3: | ADD | R0, R2 | → R1 |
| 4: | MUL | R1, #5 | → R5 |
| 5: | AND | R3, R1 | → R4 |
| 6: | MOVE | #5 | → R1 |
| 7: | SUB | #1, R3 | → R2 |
| 8: | LOAD | #3fd0 | → R0 |

The representation of the MOVE instruction in line 1 is shown in FIG. 1; a Long Constant Expression, #3 is created, and assigned to abstract Register R0 by creating a reference leading from R0 to #3. The MOVE instruction in line 2 references the value of abstract register R6, and a Register Reference Expression is used to represent this and is assigned to R2. The Register Reference (RegRef) Expression in FIG. 1, @R6, represents the value of Register R6, whatever it may be. The RegRef Expression @ R6 becomes the current definition of Register R6. From this point onwards, unless Register R6 is redefined, it will return the Expression @R6 as its definition.

Figure 2:
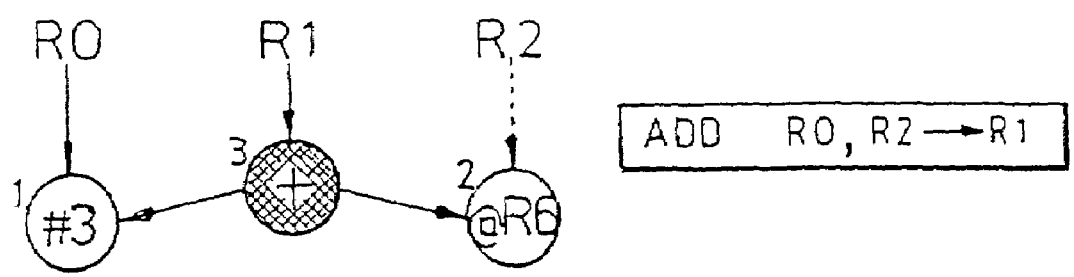

The operand of a subject processor instruction may either be a constant or a reference to a Register. The representation of a constant operand is straightforward as was shown in FIG. 1. When an operand refers to a register however the situation is different. The representation of line 3 of the pseudo-assembler code is shown in FIG. 2 from which it will be seen that the ADD operation is assigned to abstract register R1, by a reference from R1 to an Add Expression. The ADD instruction in line 3 refers to registers R0 and R2, and the Expression that defines each of these registers has already been built in intermediate representation. When the Add Expression is created, it interrogates abstract Registers R0 and R2 to yield their defining Expressions, and the Add Expression (which is assigned to abstract register R1) makes a reference to these. The intermediate representation of the ADD instruction is shown in FIG. 2. In other words, the contents of abstract Register R1 is an Expression which references the Expressions held in the abstract Registers R0 and R2. Each arrow in FIGS. 1 and 2 represents a reference, which can either reference a Register to an Expression, as in the case of R0→#3, or an Expression to another Expression, as in the case of #3←÷→@R6. The Expression @R6 has two references, one from Register R2, and the other from the Add Expression.

Figure 3:
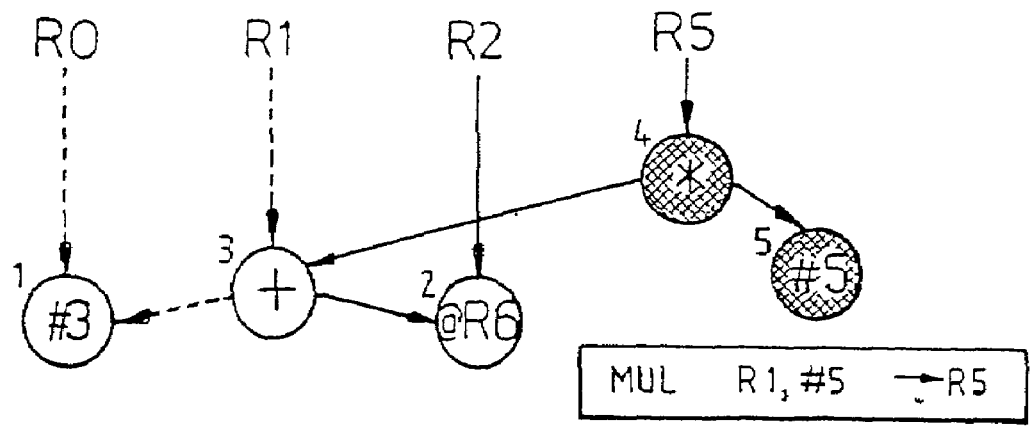

A MUL instruction, as included in line 4 of the above code, may be regarded as a typical data flow instruction. A top-level Expression is built by either creating new sub-Expressions or referencing existing Expressions, and this top-level Expression is assigned to a Register as its definition. The intermediate representation of the MUL instruction is shown in FIG. 3. A Mul Expression which references the Expression held in the abstract Register R1, and references a Long Constant Expression #5, is created and assigned to abstract Register R5.

Figure 4:
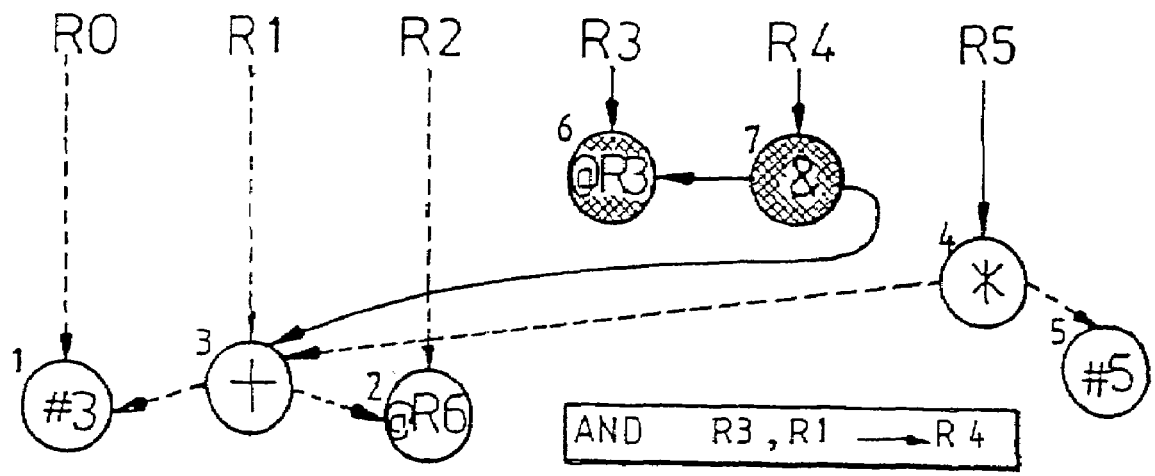

The And Expression of line 5 of the above code is shown in FIG. 4. This Expression references a Register whose definition has yet to be built (ie. R3), using a RegRef Expression in the same way as described above in relation to FIG. 1.

Figure 5:
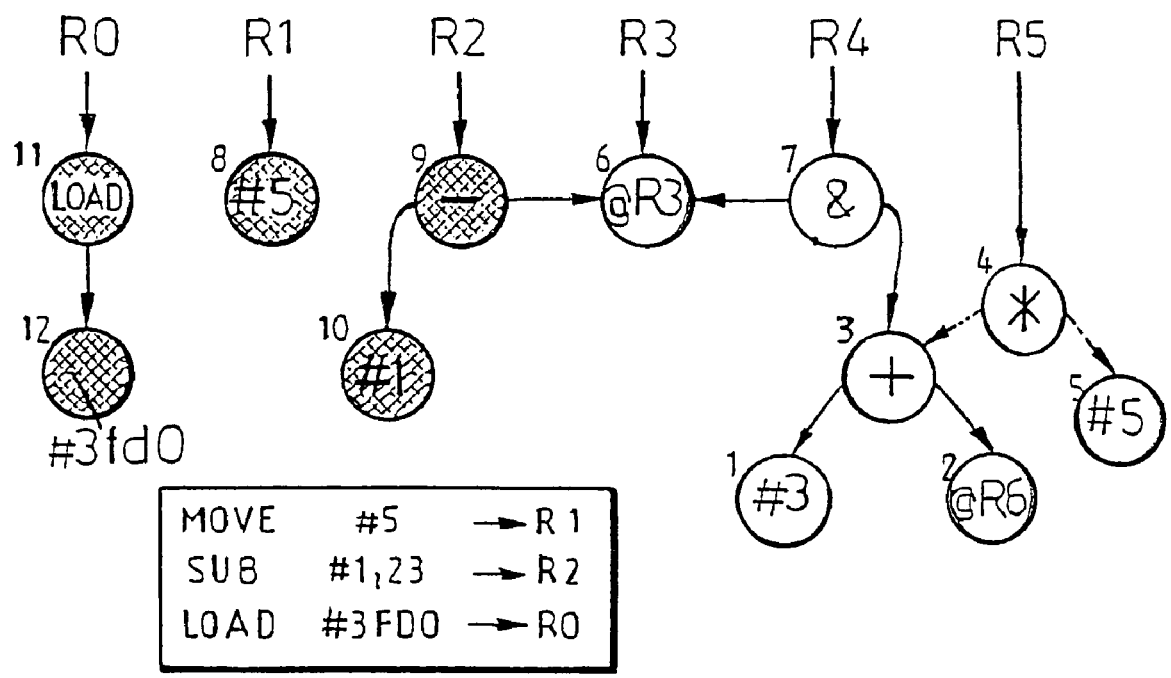

In the examples thus far presented, it has been assumed that a Register is defined for the first time within a particular Basic Block. FIG. 5 illustrates what happens when a Register that has already been defined is redefined, as by the MOVE instruction of line 6 of the above code. Whereas in FIGS. 2 to 4, an arrow referenced R1 to an Add Expression, this reference is now removed, and a new reference arrow is created to reference RI to the Long Constant Expression #5.

As well as being connected to R1, the Add Expression was also connected to the Mul Expression and the And Expression, and therefore continues to have an existence as is shown in FIG. 5 (if however the Add Expression had only one reference, the one from Register R1, the Add Expression would be left with no references after R1 was redefined; in this case the Add Expression would be known as 'dead', and would be redundant). In addition, FIG. 5 illustrates the effect of the SUB operation of line 7 of the pseudo-assembler code.

The final line, line 8, of the pseudo-assembler code to be represented as intermediate representation is a LOAD instruction. A Load Expression which represents this instruction is shown in FIG. 5, referenced to Register R0. The Load Expression can be thought of as a type of unary operator that represents the result of applying the LOAD operation to its single Expression operand. In FIG. 5, LOAD →#3fd0 represents the value at a memory location 3fd0 whatever this value may be. The Load Expression has similar properties to the RegRef Expression, in that one Load Expression may represent any possible value depending on what data is stored in memory.

A reference count is maintained which indicates the number of references leading to each expression object (the reference count of any given expression object does not include references from that expression object). Each time a reference is made to an expression object (either from a register or another expression object), or is removed from that expression object, the reference count for that expression object is adjusted. A reference count of zero for a given expression object, indicates that there are no references leading to that expression object, and that that expression object is therefore redundant. When a reference count for a given expression object is zero, that expression object is eliminated from the intermediate representation.

Once an expression object has been eliminated, any references which lead from that expression object are also eliminated, and the reference count of those expression objects to which the references lead is adjusted accordingly. The process of eliminating expression objects with a zero reference count and eliminating references leading from such an object is followed down the expression forest.

Further optimisation of the intermediate generalisation may be achieved by eliminating redundant lines of subject processor code, as described below.

When a complicated instruction is decoded from the subject processor code into intermediate representation, it is common that only a subset of the possible effects of that instruction will ever be used at a given place in the subject program. For example, in a CISC instruction set, a memory load instruction may be defined to operate differently depending on what type of descriptor is contained in a base register (the descriptor describes how information is stored in the memory). However, in most programs only one descriptor type will be used by each individual load instruction in the program.

In the emulation system of the invention, the Front End queries run-time values as the subject processor program is being executed, and generates special-case intermediate representation as necessary. In the example given above, special-case intermediate representation will be generated which omits those parts of the memory load instruction which relate to descriptor types not used by the program.

The special-case is guarded by a test which, if it ever detects at run-time that additional functionality is required, causes re-entry to the Front End to produce additional code. If, during optimisation, it is discovered that an initial assumption is wrong (for example an assumption that a particular descriptor type is being used throughout the program), the optimiser will reverse the sense of the test, so that a more frequently-used functionality will be selected more quickly than the initially chosen, less frequently-used functionality.

The emulation system of the invention is capable of emulating subject processors which use variable-sized registers, as described below.

An example of an instruction-set architecture which uses a variable-sized register is the architecture of the Motorola 68000 series of processors. In the 68000 architecture, instructions that are specified as 'long' (0.1) operate on all 32 bits of a register or memory location. Instructions that are specified as 'word' (.w) or 'byte' (.b) operate on only the bottom 16 and bottom 8 bits respectively, of a 32-bit register or memory location. Even if a byte addition, for example, generates a carry, that carry is not propagated into the 9th bit of the register.

To avoid conflict between different instructions operating on data of different widths (in this example in a 68000 processor), for each subject processor register the system according to the invention creates a set of three abstract registers, each register of the set being dedicated to data of a given width (ie. one register for each of byte, word and long word data). Each register of a 68000 processor always stores a 32-bit datum, whereas instructions may operate on 8-bit or 16-bit subsets of this 32-bit datum. In the Core of a system whose Front End is configured to be connected to a 68000, byte values for a subject processor 'd0', for example, will be stored in an abstract register labelled 'D0_B', whereas word values are stored in a separate abstract register labelled 'D0_W', and long values are stored in a third abstract register labelled 'D0_L'. In contrast to the data registers, the 68000 address registers have only two valid address sizes: word and long. In this example therefore, the Core will need only two abstract registers to represent each 68000 address register: 'A0_L' and 'A0_W'.

If no conflict regarding instruction size arises within a particular Basic Block of subject processor instructions (ie. if all of the instructions within that Basic Block are of the same bit width), the data contained in the appropriate abstract register can be accessed freely. If, however, a conflict does arise (ie. instructions of different bit widths are stored/read from a given subject processor register), the correct data may be derived by combining the contents of two or more abstract registers in an appropriate way. An advantage of this scheme is that the Core is simplified since all operations on abstract registers are carried out on 32-bit data items.

The difference between subject processor registers and abstract registers is of importance when considering the effect of variable-sized registers. A subject processor register, such as 'd0' in the 68000 architecture, is a unit of fast store in a subject processor, which unit is referred to in assembler operands by its label ('d0' in this case). In contrast to this, abstract registers are objects which form an integral part of the intermediate representation of the Core, and are used to represent the set of subject processor registers. Abstract registers contain extra semantics over and above those in a subject processor register, and any number of abstract registers may be used to represent a single subject processor register, provided that the correct semantics for interaction with the subject processor are preserved. As mentioned above, in the invention, the Front End requires three abstract registers to represent each 68000 data register (ie. one for each width of data: byte, word and long word), and two abstract registers to represent each 68000 address register. In contrast to this, an implementation of a MIPS Front End, for example, might map a single subject processor register to a single abstract register.

The tables below summarise for the 68000 how the contents of two or more abstract registers are treated when instructions of different sizes read and write to a subject processor register. The manner in which data is combined depends on the current state of the subject processor register.

TABLE 1a

| | Current State (d0) | |
|---|---|---|
| D0_L | D0_W | D0_B |
| ✓ | X | X |
| ✓ | X | ✓ |
| ✓ | ✓ | X |
| ✓ | ✓ | ✓ |

TABLE 1b

New State After Writing (d0)

| Long Word | | | Word | | | Byte | | |
|---|---|---|---|---|---|---|---|---|
| D0_L | D0_W | D0_B | D0_L | D0_W | D0_B | D0_L | D0_W | D0_B |
| ✓ | X | X | ✓ | ✓ | X | ✓ | X | ✓ |
| ✓ | X | X | ✓ | ✓ | X | ✓ | X | ✓ |
| ✓ | X | X | ✓ | ✓ | X | ✓ | ✓ | ✓ |
| ✓ | X | X | ✓ | ✓ | X | ✓ | ✓ | ✓ |

TABLE 2a

Current State (d0)

| D0_L | D0_W | D0_B |
|---|---|---|
| ✓ | X | X |
| ✓ | X | ✓ |
| ✓ | ✓ | X |
| ✓ | ✓ | ✓ |

TABLE 2b

Combine Before Reading

| L | W | B |
|---|---|---|
| D0_L | D0_L | D0_L |
| D0_L/D0_B | D0_L/D0_B | D0_B |
| D0_L/D0_W | D0_W | D0_W |
| D0_L/D0_W/D0_B | D0_W/D0_B | D0_B |

Tables 1 and 2 represent the state of a subject processor register 'd0' in terms of abstract registers D0_L, D0_W and $D_0\_B$, (ie. the abstract registers which represent subject processor register 'd0').

Table 1a "Current State" represents a given state of the register d0, by indicating whether or not each of the abstract registers D0_L, D0_W and D0_B contains valid data. The first row of Table 1a represents a given state of the register d0, namely that the register contains 32-bit data, and indicates that only the abstract register D0_L (corresponding to 32-bit data) contains valid data. If, for example, it is assumed that initially, all 32 bits of subject processor register 'd0' are valid, the current state of 'd0' will be as is represented by the first row of the Table 1a (an X symbol indicates that the marked register does not contain any valid data).

Table 1b "New State after Writing" illustrates the effect of write instructions performed in accordance with the present invention. If d0 contains 32-bit data, as indicated by the first row of Table 1a, and is then written to by a long instruction, the effect of the write operation is as indicated by the first row of the 'Long Word' section of Table 1b. Abstract register D0_L remains valid (ie. contains valid data) as indicated by a '✓' symbol, whereas abstract registers D0_W and D0_B remain invalid, as indicated by a 'X' symbol since no data has been written to them. The state of 'd0' therefore has not been changed.

If 'd0', in the state shown in the first row of Table 1a, is written to by a byte of data, the new current state of 'd0' is represented by the 'Byte' section of Table 1b. In this case the register is valid for both long data and byte data (ie. both abstract registers D0_L and $D_0\_B$ contain valid data).

Tables 2a "Current State" and 2b "Combine before Reading" illustrate how the contents of abstract registers D0_L, D0_W and D0_B are combined when data is to be read from subject processor register 'd0'. For instance, if the current state of register d0 is as indicated in the second row of Table 2a, then abstract registers D0_L and D0_B contain valid data. If register d0 is read by a long instruction (ie. all 32-bits are read from 'd0'), row 2 of Table 2b at column L shows that the correct value of 'd0' must be derived by combining the contents of abstract registers D0_L and D0_B in an appropriate way. In this case the bottom 8 bits of register D0_B must be combined with the top 24 bits of register D0_L. On the other hand, if subject processor register 'd0_' were to be read by a byte instruction, the contents of D0_B could be read directly, without reference to abstract registers D0_L or D0_W.

The use of separate abstract registers for each width of data, as described above, allows data to be accessed easily when a section of subject processor code which uses a single width of data is being emulated. This is a very common situation and will arise, for example, where one section of a program operates on bytes of data, for example character processing code, and another section of the program operates on 32-bit data, for example pointer manipulation code. The invention only requires a calculation to be made (ie, the combination of data of different widths) on those infrequent occasions when data of different widths are written to and read from a subject processor register.

The known techniques of creating a complicated expression which manipulates different sections of a subject processor register in an appropriate manner require calculations to be made for every read and/or write to a subject processor register. In contrast to this, the invention requires calculations on infrequent occasions, thereby providing a more efficient representation of subject processor registers.

The invention requires that the unambiguous current state (i.e. the validity or otherwise of each of the three component abstract registers) of each subject processor register is known at all times, so that the correct combination of abstract registers may be made when a read instruction is made to the subject processor register which those abstract registers represent.

If the initial state of a subject processor register on entry to a Basic Block were to be unknown at translate time, target-processor code to test the state of the register would have to be generated. For this reason, the emulation system according to the invention ensures that the state of each subject processor register is always known at translate time. In the system according to the present invention this is done by propagating the register state from one Intermediate Representation (IR) Block to the next. For example, IR Block 100 propagates the state of 'd0' to its successor IR Block 200 and IR Block 200 acts in a similar way propagating register state to IR Block 300. An example of this propagation of the subject processor register state is shown in FIG. 6.

Figure 6:
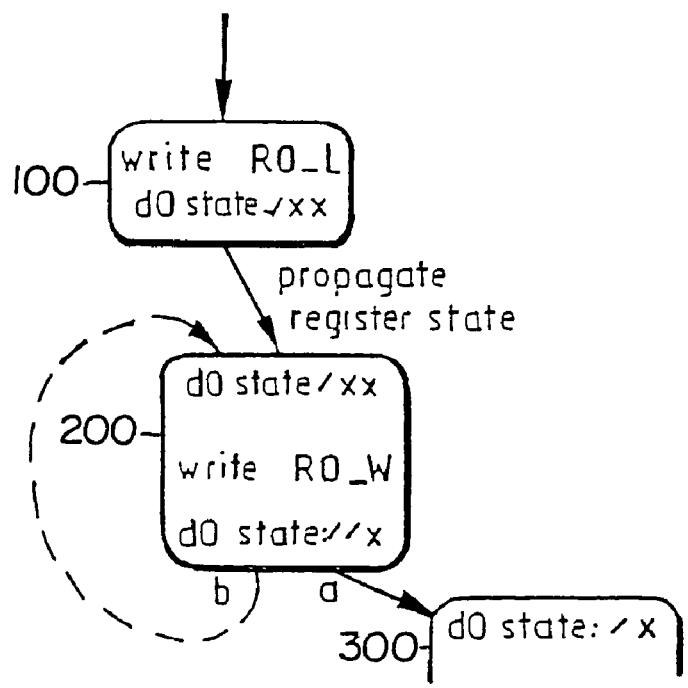
FIGS. 6 and 7 are schematic illustrations of the manner in which the dynamic emulation system generates an intermediate representation of a Basic Block of a program that depends upon starting conditions at the beginning of that Basic Block of the program.

In FIG. 6, IR Block 200 has two possible successors, either IR Block 300 or back at the beginning of IR Block 200. The route between IR Blocks 200 and 300 is shown with an arrow labeled as 'a'. The route from the end back to the beginning of IR Block 200 is shown as a dotted line labeled 'b' (a dotted line is used since, although this route exists it has not yet been traversed in the current execution of the translated program). If during the execution of the translated program, IR Block 200 were to branch back to itself along route 'b', the states it propagates would be incompatible with the abstract registers states which were originally passed to IR Block 200 by IR Block 100. Since the intermediate representation is specific to the state of the abstract registers IR Block 200 cannot be re-executed. For the correct operation of the invention across IR Block boundaries, each IR Block must have an unambiguous representation of the current state of the subject processor register (as represented by the abstract registers). The existence of route 'b' therefore is incompatible with the operation of the invention across the boundary between IR Block 100 and IR Block 200.

Figure 7:
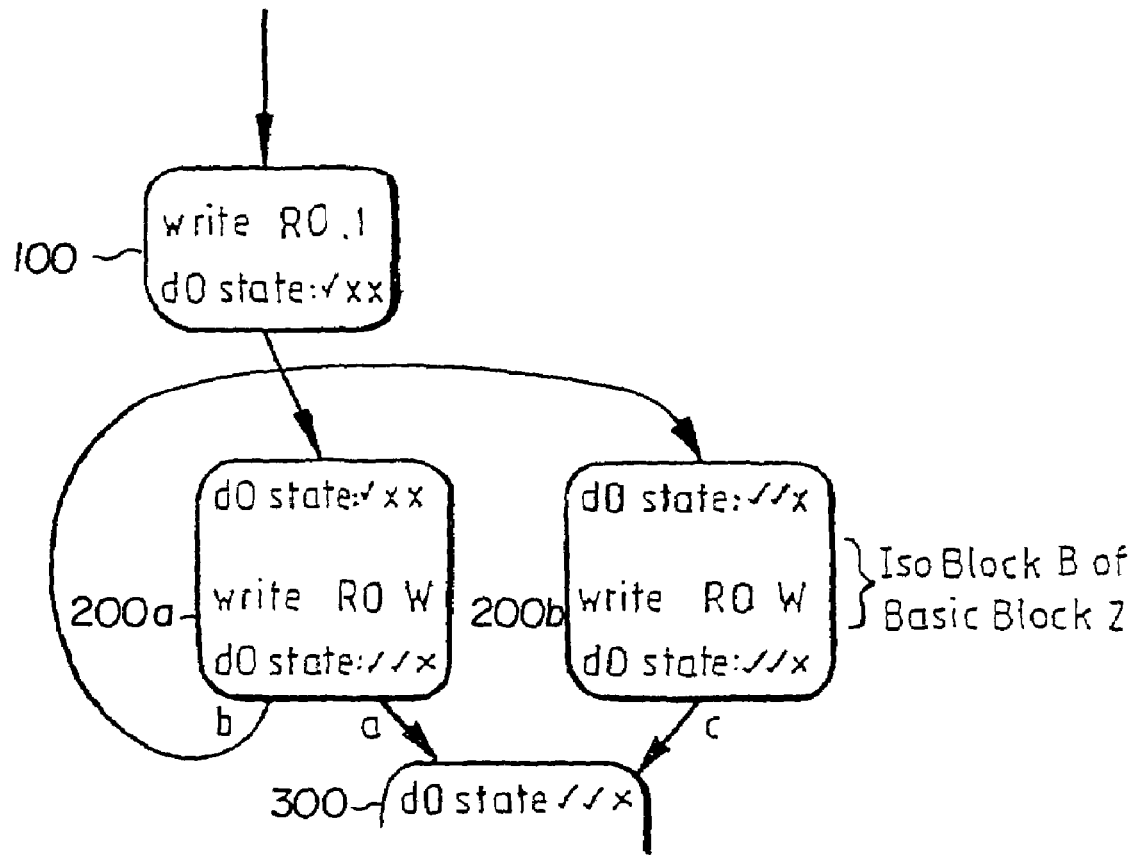

To overcome this problem the invention is able to represent a Basic Block of subject processor code using more than one IR Block with different entry conditions. The IR Blocks which are used to represent a single Basic Block with different entry conditions are referred to as IsoBlocks. Each IsoBlock is a representation of the same Basic Block of subject processor code, but under different entry conditions. FIG. 7 shows two IsoBlocks which are used to overcome the problem illustrated in FIG. 6. IsoBlock 200a is a correct representation of Basic Block 2, but only if the state of subject processor register 'd0' at the start of IR Block 200 is ✓XX (this corresponds to IR block 200 of FIG. 6). When successor route 'b' in FIG. 7 is traversed for the first time, all the IsoBlocks in existence which represent Basic Block 2, (there is only one in this case, the IR Block), are tested for compatibility with the abstract register states that are to be propagated (i.e. ✓✓X). If a compatible IsoBlock is found (i.e. one that begins with the register state ✓✓X), the successor route 'b' will be permanently connected to that IsoBlock. In the illustrated example of FIG. 7 there is no existing IsoBlock that route 'b' is compatible with, and so new IsoBlock 200b, must be created. IsoBlock 200b is created by decoding for a second time the subject processor instructions that make up Basic Block 2, using an initial assumption that the state of subject processor register 'd0' at the start of Basic Block 2 is ✓✓X.

When successor route 'c', originating from IsoBlock 200b, is traversed for the first time, a compatibility test is performed with IR Block 300. Since route 'c' is compatible with IR Block 300 a new IsoBlock does not need to be created, and both successor route 'a' and successor route 'c' are connected to IR Block 300.

The low-level details concerning the compatibility test mentioned above will differ between different Front End modules, since they depend on the exact nature of overlapping registers provided in the subject processor architecture. The necessary modifications of these details will be apparent to those skilled in the art.

The principle of creating an IsoBlock of intermediate representation for a given set of abstract register states on entry may be widened to an intermediate representation which represents a Basic Block of subject processor code for specific values of a broad set of initial conditions. Known intermediate representations represent a block of instructions for all possible initial starting conditions, and are therefore required to include a significant amount of flexibility. Intermediate representation formed in this manner is by necessity complicated, and will in general include elements which will never be used during execution.

The intermediate representation according to the invention is advantageous because it represents a Basic Block of code for specific values of entry conditions and is therefore more compact than known intermediate representations. A further advantage of the invention is that all intermediate representation which is generated is used at least once, and time is not wasted producing unnecessary additional representation.

Although the above description is directed towards emulation, it will be appreciated by those skilled in the art that the invention may also be used in other applications, for example the optimisation of code during compilation.

We claim:

1. A program storage medium storing an emulation system for executing a register-based program code written for a first computer on a second computer, wherein the first computer has a set of registers including at least one variable size register which is addressable by the program code in a plurality of different widths, the emulation system, when executed by the second computer, being operative to generate an intermediate representation of said program code by a process comprising the steps of:

generating a plurality of register objects representing said registers of said first computer as referred to by the program code;

representing the at least one variably sized register of said first computer by an associated set of said register objects, one register object being provided for each width of the variably sized register as referred to by the program code; and wherein said process comprises the further step of generating expression objects, each representing a different operator or operand of the program code as that element arises in the program code, each expression object being referenced by a register object to which it relates either directly, or indirectly via references from other expression objects.

2. The medium according to claim 1, wherein a write operation to the variably sized register at a particular width is represented in the intermediate representation by writing to the register object corresponding to the appropriate width and maintaining a record of which register objects contain valid data.

3. The medium according to claim 2, wherein a read operation from a variably sized register is represented in the intermediate representation by determining from said record if there is valid data in more than one corresponding register object which must be combined to give the same effect as reading from the variably sized register, and if it is determined that no such combination is required, reading from the appropriate register object; and if it is determined that such combination is required, combining the contents of appropriate register objects to provide a read value.

4. A program storage medium storing an emulation system for executing a register-based program code written for a first computer on a second computer, wherein the program code refers to a set of registers including at least one variable size register which is addressable by the program code in a plurality of different widths, the emulation system, when executed by the second computer, being operative to generate an intermediate representation of said program code by a process comprising the steps of:

generating a plurality of register objects representing the registers of the first computer as referenced by the program code; and generating at least one set of associated register objects, each set of register objects representing a respective one of the variable sized registers, the set comprising one register object for each possible width of the respective variable sized register, and wherein the process further comprises the computer implemented steps of:

for each write operation of a certain field width to the variable sized register, writing to the register object of the same width;

maintaining a record of which register objects contain valid data, the record being updated upon each write operation; and for each read operation of a given field width, determining from said record whether there is valid data in more than one of said register objects which must be combined to give the same effect as the same read operation performed upon the variable size register; and a) if it is determined that no combination is so required, reading directly from the appropriate register object; or b) if it is determined that data from more than one register object must be so combined, combining the contents of those register objects.

5. The medium according to claim 4, wherein the step of determining whether or not the contents of more than one register object must be combined and, if so, which register objects must be combined, is determined in accordance with the following conditions in respect of each set of different sized register objects:

if the data required for an access lies wholly within one valid register object, that register only is accessed; and if the data required for an access lies within more than one valid register object, data is combined from those valid register objects to perform the access.

6. The medium of claim 5, wherein said process comprises the further step of generating expression objects, each representing a different operator or operand element of the program code as that element arises in the program code, each expression object being referenced by a register object to which it relates either directly, or indirectly via references from other expression objects.

7. An emulation system stored on a computer readable medium, said emulation system operable to generate an intermediate representation of a register-based program code which refers to at least one variable size register which is addressable by the program code in a plurality of different sizes, by a process comprising the steps of:

generating a plurality of register objects representing registers as referenced in the register-based program code;

representing the at least one variably sized register by a plurality of said register objects, one register object being provided for each possible size of the variably sized register as referenced in the register-based program code; and wherein said process comprises the further step of generating expression objects, each representing a different operator or operand element of the program code as that element arises in the program, each expression object being referenced by a register obiect to which it relates either directly, or indirectly via references from other expression objects.

8. The medium according to claim 7, wherein in response to a write operation in the program code to the variably sized register, the process comprises representing the write operation in the intermediate representation as writing to the register object corresponding to the appropriate size and maintaining a record of which of the register objects contain valid data.

9. The medium according to claim 8, wherein in response to a read operation in the program code from a variably sized register, the process comprises representing the read operation in the intermediate representation by determining from said record if there is valid data in more than one corresponding register object which must be combined to give the same effect as reading from the variably sized register, and if it is determined that no such combination is required, reading from the appropriate register object; and if it is determined that such combination is required, combining the contents of appropriate register objects to provide a read value.

10. A program storage medium storing an emulation system for executing a register-based program code written for a first computer on a second computer, wherein the program code refers to at least one variable size register which is addressable by the program code in a plurality of different widths, the emulation system, when executed by the second computer, being operative to generate an intermediate representation of said program code by a process comprising the steps of:

generating a plurality of register objects representing the registers of the first computer as referenced by the register-based program code;

generating a set of associated register objects representing the variable sized register, the set comprising one register object for each possible width of the variable sized register as referenced by the register-based program code;

for each write operation of a certain field width to the variable sized register, writing to an register object of the same width;

maintaining a record of which of the register objects contain valid data, the record being updated upon each write operation; and for each read operation of a given field width, determining from said record whether there is valid data in more than one of said register objects of the set which must be combined; and if it is determined that no combination is so required, reading directly from the appropriate register object; or if it is determined that data from more than one register must be so combined, combining the contents of those register objects.

11. The medium according to claim 10, wherein the step of determining whether or not the contents of more than one register object must be combined and, if so, which register objects must be combined, is determined in accordance with the following conditions in respect of the set of associated register objects:

if the data required for an access lies wholly within one valid register object, that register only is accessed; and if the data required for an access lies within more than one valid register object, data is combined from those valid register objects to perform the access.

12. The medium of claim 11, wherein said process comprises the further step of generating expression objects, each representing a different operator or operand element of the program code as that element arises in the program, each expression object being referenced by a register object to which it relates either directly, or indirectly via references from other expression objects.

13. A program storage medium storing an emulation system for converting subject code into target code by a process comprising the computer-implemented steps of:

(a) receiving the subject code expressed in an instruction set of a subject processor having at least one variable size register, wherein the variable size register is accessible by the subject code in a plurality of different width sub-fields overlaying part or all of a full width of the variable size register, and wherein the subject code includes at least write operations and read operations with respect to the variable size register;

(b) generating an intermediate representation from the subject code, including performing the steps of:

generating a set of associated register objects each representing a different width sub-field of the variable size register;

representing each write operation in the subject code of a certain sub-field width to the variable size register, as a write operation to the register object of the same width and maintaining a record of which the register objects contain valid data, the record being updated upon each such write operation; and representing each read operation in the subject code of a certain sub-field width from the variable size register, as a read operation from one or more of the register objects by determining from the record whether there is valid data in more than one of the associated set of register objects which must be combined to give the same effect as the same read operation performed upon the variable size register in the subject code, and (i) if it is determined that no combination is so required, reading directly from the appropriate register object; or (ii) if it is determined that data from more than one of the register objects must be so combined, combining the contents of those register objects; and (c) converting the intermediate representation into target code expressed in an instruction set of a target processor, including allocating the determined register objects to registers of the target processor and generating target code instructions which write to and read from the allocated target registers, according to the write operations and read operations defined in the intermediate representation.

* * * * *